United States Patent [19]

Machurat et al.

[11] 4,251,281

[45] Feb. 17, 1981

[54] SYNTHETIC AMORPHOUS SILICA FOR ELASTOMERIC REINFORCEMENT AND METHODS THEREFOR

[75] Inventors: Jean Machurat, Neuville/s/Saone; Jean-Claude Morawski, Decines; Georges Vrisakis, Collonges-au-Mont-d'Or, all of France

[73] Assignee: Rhone-Poulenc Industries, Paris, France

[21] Appl. No.: 35,074

[22] Filed: May 1, 1979

Related U.S. Application Data

[63] Continuation of Ser. No. 802,539, Jun. 1, 1977, abandoned.

[30] Foreign Application Priority Data

Jun. 4, 1976 [FR] France .................................. 76 16962

[51] Int. Cl.$^3$ ........................ C09C 1/28; C01B 33/187
[52] U.S. Cl. .................................. 106/288 B; 423/339; 260/765; 260/42.15; 106/309
[58] Field of Search ................... 106/288 B; 423/335, 423/339; 260/42.14, 42.15, 765, 42.33

[56] References Cited

U.S. PATENT DOCUMENTS

| 3,503,707 | 3/1970 | Burke | 106/288 B |
| 3,709,980 | 1/1973 | Chisholm | 106/288 B |
| 3,967,563 | 7/1979 | Wason | 106/288 B |
| 4,059,558 | 11/1977 | Golombeck et al. | 260/765 |

FOREIGN PATENT DOCUMENTS

2159580 5/1973 France .

*Primary Examiner*—Jacqueline V. Howard
*Attorney, Agent, or Firm*—Burns, Doane, Swecker & Mathis

[57] ABSTRACT

A synthetic amorphous silica having a CTAB surface area of from about 80 to about 125 m$^2$/g and a structure index of at least 0.80 is disclosed as adapted for the reinforcement of elastomeric materials, as well as methods for the preparation thereof.

13 Claims, No Drawings

SYNTHETIC AMORPHOUS SILICA FOR ELASTOMERIC REINFORCEMENT AND METHODS THEREFOR

This is a continuation of application Ser. No. 802,539, filed Jun. 1, 1977, now abandoned.

BACKGROUND OF THE INVENTION

1. Field of the Invention:

The present invention relates to improved synthetic amorphous silicas particularly adapted for the reinforcement of elastomeric materials, especially tires. The present invention also relates to methods for the preparation of these new synthetic amorphous silica materials.

2. Description of the Prior Art:

Reinforcement materials for elastomers, particularly tires, have hitherto been based upon the carbon blacks. Recent attention has been given the feasibility of replacement of carbon black reinforcement by various silica materials, since the latter have been found to provide sufficient tearing resistance and satisfactory traction or frictional stability on wet or icy surfaces when incorporated in a tire tread. While generally noted as an adequate replacement for carbon blacks, unfortunately the incorporation of silica materials has been accompanied by a concomitant trading of important properties observed in tires employing the same in the treads. For example, silica materially increases the tendency for tire treads to heat during use and also tends to reduce the abrasion resistance thereof. Certain disadvantages have been minimized by the additions of various coupling agents, such as silanes, but again not without the need to suffer other significant disadvantages such as, for example, an unpleasant odor, increased production costs, and scorching of the elastomer at temperatures encountered during use of the tire.

Ideally, silicas to be employed in replacement of carbon black reinforcement additives for tires should provide all of the advantages of the latter without suffering these significant deficiencies. Initial efforts in this regard have centered on the establishment of a simple relationship between specific areas (BET) of the silica and its behavior in vulcanized materials.

Accordingly, the U.S. Pat. No. 3,235,331 discloses a method for preparing silicas for the express purpose of reinforcing elastomers wherein the silica material is prepared with an eye toward the control of its specific area. Thus, the patentees disclose a method of producing finely divided siliceous pigments by reacting aqueous alkali metal silicate solutions, such as aqueous sodium silicate solutions, with an acidification agent to yield a precipitate having a surface area on the order of 200 m$^2$/g.

Other efforts, such as those described in U.S. Pat. No. 3,445,189, have correlated specific area and oil-absorption characteristics of silica particulates adapted for the reinforcement of, e.g., rubber. In this regard, the patentees indicate that the finely divided silica must possess a surface area of from 100 to 250 m$^2$/g and an oil absorption of at least 2 cm$^3$/g.

Further along these lines, U.S. Pat. No. 2,731,326 provides correlation between specific surface area and oil-absorption capacities of dense amorphous silica aggregates. The patentees disclose a process to yield a silica in the form of aggregates having a particle size greater than that evident in the colloidal state and a specific area of from 60 to 400 m$^2$/g. The particles exist as spheroids of dense amorphous silica of substantially uniform size, linked in an open reticulated structure which is uniformly reinforced with dense amorphous silica such that, after drying, the oil-absorption index (expressed in milliliters per 100 grams of solid substance) lies between 1 and 3 times greater than the value of the specific area expressed in m$^2$/g (BET). In providing particles characterized in this fashion, the patentees further indicate the necessity of specifically limiting:

(a) the size of the ultimate spheroidal units;
(b) the openness of packing of the ultimate units in the reticulated aggregate structure;
(c) the extent to which the structure is reinforced; and,
(d) the uniformity of the structure.

Consequently, careful process control is mandated.

In French Pat. No. 1,506,330, some of the present invention disclose a method for producing particulate silicas adapted for use as additives, particularly in rubbers, which particulates are characterized as possessing a relatively high surface area (BET) on the order of about 300 m$^2$/g, and further characterized as having a roughness factor of between about 2.5 and about 3.5, this latter characteristic being determined as the ratio of the specific area (BET) to the area calculated by electron microscopy techniques. Accordingly, yet another factor has been determined significant with respect to the parameters necessary for insuring the commercial utility of silica particulates as reinforcement for elastomeric materials.

Still another criterion deemed important is the water content of the filtration cake formed during preparation of the silica particulate, and its correlation with the behavior of these materials in rubbers. Thus, there must be differentiated silicas having a high water content and those having a low water content, designated as high-structure silicas and low-structure silicas, respectively.

The art recognizes that still further physical and chemical characteristics are of extreme importance regarding the use of silicas in the reinforcement of elastomers. However, there is no generally accepted agreement as to the relative importance of the various phenomena responsible for the reinforcement of elastomers. See, for example, Dannenberg et al, *R.G.C.P.*, v. 51, n. 5, 1974.

significantly, also, is the inability to predict, from first principles, the manner in which various silicas might replace carbon blacks in the reinforcement of elastomers. Differences in behavior may be attributed to, inter alia, the morphological differences between these two differing types of additives, which precludes the ability to extrapolate data from one to another. Accordingly, predictions based upon specific areas and oil-absorption indices, generally employed as indicators of the behavior of carbon blacks in elastomers, typically lead to contradictory results respecting silica replacements therefor. For example, the oil index (DBP number) of carbon blacks ranges from about 40 to about 140 cm$^3$/100 g, while the oil index of silicas may be as high as about 500 cm$^3$/100 g. While this information would reasonably lead to a postulate that these silicas possess considerable reinforcing action, actual observations fall to confirm the same. Further anomalous results regarding silicas is the fact that silica particulates having considerably different specific areas (BET) and oil-absorption capacities may well behave in similar manners in a given rubber material.

Therefore, the need exists to provide a silica particulate specifically adapted as a reinforcement additive for elastomeric materials and a commercially-acceptable method therefor. The need also exists to provide such materials and processes which may consistently be employed with reproducible and predictable results.

SUMMARY OF THE INVENTION

In accordance with the noted deficiencies of the prior art, it is a primary object of the present invention to provide silica particulates specifically adapted to replace carbon blacks as the reinforcement additives in elastomeric materials.

It is also an object of the present invention to provide such silica particulates for the reinforcement of tires and tire treads.

Yet another object of the present invention is to provide a method for the reproducible and predictable preparation of silica particulates adapted for the reinforcement of elastomeric materials.

Yet a further object of the present invention is to provide such a process which is simple, economical, and efficient in commercially-acceptable terms.

Yet other objects and advantages of the present invention will become apparent to the skilled artisan upon examination of the detailed description of the invention.

It has now been determined, in accordance with the present invention, that a new synthetic amorphous silica having a CTAB area of between about 80 and about 125 $m^2/g$, and a structure index of the least 0.80, is extremely well suited for use as a reinforcement in elastomeric materials and may very successfully replace the carbon blacks heretofore employed to these ends. The synthetic amorphous silica of the present invention is further characterized as having an oil-absorption index (DBP) of between about 240 and about 320 $cm^3/100$ g, and a BET surface area of between about 80 and about 310 $m^2/g$, wherein the ratio of the BET to CTAB areas is at least 1.1.

These improved synthetic amorphous silicas may be produced by reacting a strong acid with an alkaline silicate solution, wherein the acid is added to the solution at a variable rate to maintain residual alkalinity of the medium substantially constant with time, such addition optionally being interrupted periodically when maximum polymer formation is reached. The silicate is most preferably formed by a sodium silicate having an $SiO_2/Na_2O$ molar ratio of between about 2 and about 4, the initial concentration thereof being between about 90 and about 150 g/l of $SiO_2$, and which is adjusted from that range to an $SiO_2/Na_2O$ molar ratio of 3.5, such that the final $SiO_2$ concentration ranges between about 60 and about 90 g/l. Obviously, if the initial $SiO_2/Na_2O$ ratio is 3.5, no intermediate adjustment is necessary. Reaction time may vary between about 40 and about 200 minutes, excluding any optional interruptions, while the reaction temperature may vary between about 65 and about 95° C. Reaction parameters may be selected, advantageously, to yield a water content of the cake corresponding to from about 75 to about 82%, corresponding to about 2.6 to about 3.9 kg of water per kg of finished product.

DETAILED DESCRIPTION OF THE INVENTION

In order to more fully elucidate upon the various objects and advantages of the present invention, the following detailed description thereof will be given in terms of various preferred embodiments and exemplified with respect thereto. However, the skilled artisan will readily appreciate that the same are intended as illustrative, and in no wise limitative.

In assessing the inability of the prior art processes, and silica particulates resultant therefrom, to provide a suitable replacement for carbon blacks in the reinforcement of elastomeric materials, it has been determined that two diverse considerations must be balanced. The first relates to the morphology of silica and the other to the behavior of silica additives in elastomers, further considered with the effect of the physical and chemical properties of precipitation silicas on the static and dynamic mechnical properties of vulcanized materials. In so characterizing the factors, it may be postulated that the previously established, and often times aberrant, relationships between carbon blacks and silicas may be laid, in part, to differences in morphological structures thereof. More particularly, carbon blacks conventionally employed as elastomeric additives typically have a considerable primary structure and a reduced secondary structure, as opposed to silicas wherein the secondary structure is far from negligible in relation to the primary structure.

The expression "primary structure" is meant to connote the consequences of coalescence of the ultimate particles to form aggregates. In this regard, the bonds between the ultimate particles in the aggregates are found to be strong bonds of the chemical variety. Consequently, the higher the number of primary particles in each aggregate, the greater will be the primary structure; it being appreciated that this number of final particles for a given aggregate may vary within a considerably wide range.

On the other hand, the expression "secondary structure" is meant to convey the consequences of physcial interactions between aggregates to form agglomerates. Contrary to the features of the primary structure, these latter bonds are weak and of the physical variety.

Furthermore, it may also be postulated that the very primary structure of silica is quite different from that of carbon blacks. More particularly, it may be predicted that the number of elementary particles comprising the aggregates of silicas should be less than that of carbon blacks. Considering all of the foregoing distinctions, the aforenoted contradictions between first principles and observable results, respecting, for example, the oil-absorption indices of the carbon blacks and silicas, may be explained by the fact that the oil-absorption index fully accounts for both the primary and secondary structures of the respective materials.

In like vein, the measurement of specific area by the BET method, based upon nitrogen adsorption, fully accounts for both the external surface and that of the micropores of the particular additives. Contrariwise, only the external surface of the additive is accessible to the elastomer by virtue of its dimensions; explaining why the relationship between specific area (BET) of silicas the mechanical properties of vulcanized material employing the same routinely is a matter of chance, whereas that relationship with respect to carbon blacks may be predicted in advance. Moreover, these distinctions explain the ability to improve, in a relatively simple manner, a property such as, for example, a static or rheological property, of a vulcanized material by altering a morphological property of the silica additive.

In considering the particular case of elastomers adapted for utility as tires and tire treads, additional requirements, such as, for example, resistance to breakage, bending, and elongation, as well as resistance to the effects of heat, additionally come to play. Moreover, the additive must be capable of homogeneous dispersal in the vulcanized material and must also firmly adhere thereto.

The silicas of the present invention advantageously balance all of the aforementioned criteria and may be admirably employed as an elastomeric additive which satisfactorily accounts for the static and dynamic rheological requirements of elastomers, as well as homogeneous dispersion therein. Broadly, the topic silicas are characterized as having a CTAB area of from about 80 to about 125 m$^2$/g and a structure index of at least about 0.80. Advantageously, the present silicas also exhibit an oil-absorption index of from about 240 to about 320 cm$^3$/100 g, a BET area of between about 80 and about 320 m$^2$/g, and further wherein the ratio of the BET area to the CTAB area is at least 1.1. The present silicas also exhibit a water content in the cake (alternately described as "wet cake moisture") of from about 75 to about 8%.

The determination of the ennumerated factors of area, structural indices, and oil-absorption indices are conducted on a dry product or a product brought to a dry state and prior to any physical, mechanical, chemical, or thermal treatment which may well alter the respective values. Further along these lines, the measurements for determining the various criterion were made as follows:

CTAB area: external area is determined by adsorption of cetyl-trimethyl-ammonium bromide, having a pH of 9, after the method of Jay et al, *Rubber Chemistry & Technology*, v. 44, at 1287-96, (1971).

Structure index: the structural index is indicated by the slope of the straight line obtained by plotting the specific volume of the silica, expressed in cm$^3$/g, against the decimal logarithm of pressure, expressed in kg/cm$^2$, applied to the silica, after the method of Voet et al, *Rubber World*, at 33-36, August, 1963.

Oil-Absorption index: oil-absorption is measured by absorption of dibutyl phthalate in accordance with ASTM D 281.

BET area: the specific area (BET) is determined by the conventional method of Brunauer et al, *Journal of the American Chemical Society*, v. 60, at 309, February, 1938.

Water content: water content of the cake is measured by filtering a slurry through a Buchner funnel under a reduced pressure of 60 cm Hg., washing with distilled water until the solution salts are removed, and drying the resultant cake at 105° C. Water content is thus obtained from the relationship between the weight of the removed water and the weight of the filtered cake.

One method for producing silica particles in accordance with the present invention is that described in the present inventor' French Pat. No. 2,159,580, wherein a strong acid is reacted with an alkaline silicate. The rate of acid additions may be varied in a manner such that the change in residual alkalinity of the medium remains substantially constant with time; and, acid addition may be interrupted at least once during a period of from about 5 to about 20 minutes when maximum polymer formation is reached.

The method in accordance with the present invention is also characterized, however, by employing a sodium silicate having an SiO$_2$/Na$_2$O molar ratio of between about 2 and about 4. The initial silicate concentration in the medium is adjusted such that the silicate concentration, expressed in terms of SiO$_2$, is between 90 and 150 g/l SiO$_2$. Intermediately, the SiO$_2$/Na$_2$O molar ratio is adjusted to about 3.5, to yield a final SiO$_2$ concentration between about 60 and about 90 g/l. Obviously, if the initial molar ratio of components is 3.5, intermediate adjustment is unnecessary. Total reaction time, not including any of the acidulation interruptions, is advantageously between about 40 and about 200 minutes, while reaction temperature may be varied between about 65° and about 95° C.

Surprisingly, it has been determined, from a practical point of view, that the method of the present invention may be controlled in a very simple manner by selecting a reaction temperature within the aforenoted limits and also selecting a desired water content in the cake of from about 75 to about 82%, by weight, this corresponding to between about 2.6 and about 3.9 kilograms of water per kilogram of the finished product. These parameters have been determined empirically, the range of conditions respecting the relationship between reaction temperature and water content having been learned from practical experience; there being no theoretical consideration enabling one to predict the relationship from first principles.

Based upon the foregoing empirical determination in the relationship between reaction temperature and water content of the cake, it thus becomes a simple matter to control the instant method. For this purpose, having accounted for the various operative reaction parameters, one need merely select a temperature within the stated range and determine the water content required in the cake. If the water content does not fall within the prescribed limits, temperature may than be simply regulated to yield the required result.

The values of the remaining process parameters have been determined by accounting for the requirements imposed upon the silica product resultant therefrom, and the need for establishing an industrially-acceptable procedure. Consequently, it has been found that for concentrations below 90 g/l of SiO$_2$, the water content of the cake is too high for the present method to be feasible, while concentrations beyond 150 g/l yields a viscosity too great to facilitate ease of processing. Similarly, if reaction time is maintained below the lower limit, contact between reagents is insufficient, while reaction times greater than the maximum yields a product wherein the external CTAB area is not sufficient to impart the product with the required characteristics for reinforcement additives. Thus, a particular and quite unexpected advantage of the instant method resides in the ability to effect simple control involving, for practical purposes, adjustment of only one process parameter.

It has also been determined that acid for the acidification may be added at a constantly variable rate in order to provide the proper reaction environment. However, it is equally well feasible to deliver the acid component at varying, short intervals on the order of about 10 minutes without departing from the scope of the present invention. Following the reaction, various properties of the silicas thus obtained may be improved during the drying process which, most preferably, is conducted by atomization.

In order to further illustrate the present invention, and contrast the same with conventional methods and materials resultant therefrom, the following examples will be given as illustrative:

EXAMPLES

Table I sets forth the reaction conditions for Examples 1–4, corresponding to the present invention. Example 1 illustrates a procedure wherein the residual alkalinity of the medium remains constant with time. Examples 2, 3 and 4 further illustrate the interruption of acid additions. Lastly, Example 4 demonstrates a drying treatment conducted in an oven, this leading to somewhat lower values for the CTAB area and structure index.

EXAMPLE 7

A reaction vessel having a capacity of 200 l is charged with 54 l of water, to which is added a slight amount of silicate to adjust the pH to 9.2. 67.2 l of sulfuric acid, having a density of 1.062, and 58.8 l of sodium silicate having an $SiO_2/Na_2O$ molar ratio of 3.5, and a density of 1.240 are each added simultaneously at a rate of 1.080 cm$^3$ per minute. After 50 minutes the addition of silicate is stopped while the acid additions are continued to adjust the pH value to 5. The final $SiO_2$ concentration is 76.8 l. The product obtained is dried by atomization.

Table III sets forth the reaction conditions for Examples 8 and 9, wherein temperature is divergent from that prescribed in accordance with the present invention in order to demonstrate the influence of this factor.

TABLE I

| Examples | T. in C.° | Acidulation After min. | Interruption During min. | Final pH | Final $SiO_2$ concentration (g/l) | Total time min. | Method of drying |
|---|---|---|---|---|---|---|---|
| 1 | 80 | 0 | 0 | 5 | 90 | 121 | Atomization |
| 2 | 83 | 20 | 10 | 5 | 60 | 67 | Atomization |
| 3 | 83 | 23 | 10 | 4.5 | 90 | 67 | Atomization |
| 4 | 83 | 21 | 10 | 4.5 | 90 | 67 | Stove - 105° C. |

| Examples | Capacity of reaction vessel (l) | concentration $\frac{dNa_2O}{dt}$ | Quantity of acid (l) | Density of acid | Quantity of silicate (l) | $Na_2O$ in silicate (g/l) | $SiO_2$ in silicate (g/l) |
|---|---|---|---|---|---|---|---|
| 1 | 200 | 0.3 | 67.2 | 1.060 | 120 | 40 | 135 |
| 2 | 200 | 0.7 | 100 | 1.032 | 80 | 40 | 135 |
| 3 | 200 | 0.7 | 60 | 1.080 | 120 | 40 | 135 |
| 4 | 200 | 0.7 | 60 | 1.080 | 120 | 40 | 135 |

Table II sets forth reaction conditions for Examples 5 and 6, wherein acid addition is made at a constant rate to silicates of a conventional variety. Additionally, in Example 6, the temperature and reaction times are maintained such that the water content of the cake falls within the limits for products produced in accordance with the present invention.

TABLE III

| Examples | T. in C.° | Acidulation After min. | Interruption During min. | Final pH | Final $SiO_2$ concentration (g/l) | Total time min. | Method of drying |
|---|---|---|---|---|---|---|---|
| 8 | 100 | 18 | 10 | 5 | 79 | 67 | Atomization |
| 9 | 55 | 21 | 10 | 5 | 79 | 67 | Atomization |

| Examples | Capacity of reaction vessel (l) | $\frac{dNa_2O}{dt}$ | Quantity of acid (l) | Density sulfuric acid | Quantity of silicate (l) | $Na_2O$ concentration in silicate (g/l) | $SiO_2$ concentration in silicate (g/l) |
|---|---|---|---|---|---|---|---|
| 8 | 200 | 0.7 | 53.2 | 1.080 | 122.4 | 38.5 | 113.5 |
| 9 | 200 | 0.7 | 53.2 | 1.080 | 122.4 | 38.5 | 113.5 |

Table IV shows the properties exhibited by the silica products obtained in Examples 1–9.

TABLE II

| Examples | T. in C.° | Acidulation After min. | Interruption During min. | Final pH | Final $SiO_2$ concentration (g/l) | Total time min. | Method of drying |
|---|---|---|---|---|---|---|---|
| 5 | 76 | 0 | 0 | 5 | 78.7 | 58 | Atomization |
| 6 | 90 | 18 | 10 | 5 | 83 | 63 | Stove - 105° C. |

| Examples | Capacity of reaction vessel (l) | $\frac{dNa_2O}{dt}$ | Quantity of acid (l) | Density sulfuric acid | Quantity of silicate (l) | $Na_2O$ concentration in silicate (g/l) | $SiO_2$ concentration in silicate (g/l) |
|---|---|---|---|---|---|---|---|
| 5 | 200 | * | 79.0 | 1.050 | 81.0 | 42.9 | 145.3 |
| 6 | 200 | * | 72.0 | 1.050 | 77.9 | 47 | 159.5 |

*Delivery rate of acid is constant, i.e., $dNa_2O/dt$ is variable.

TABLE IV

| | Analysis | | | |
|---|---|---|---|---|
| No. | Water content of cake % | kg water/ kg product | Humidity of final product | pH value of finished product |
| 1 | 76 | 2.8 | 7.2 | 5.8 |
| 2 | 81.4 | 3.8 | 8.5 | 6 |
| 3 | 78.2 | 3.1 | 8.7 | 5.7 |
| 4 | 78.4 | 3.2 | 7.4 | 5.8 |
| 5 | 83.2 | 4.5 | 8.3 | 6.3 |
| 6 | 77 | 3 | 8.1 | 6.1 |
| 7 | 78.6 | 3.4 | 8.5 | 6.2 |
| 8 | 71 | 2.15 | 8.1 | 5.8 |
| 9 | 83 | 4.3 | 9 | 6.1 |

| BET area No. | BET area (m²/g) | CTAB area (m²/g) | Structure index | DRP (cm³/100g) |
|---|---|---|---|---|
| 1 | 240 | 80 | 0.90 | 260 |
| 2 | 305 | 122 | 1.00 | 318 |
| 3 | 290 | 102 | 1.00 | 290 |
| 4 | 305 | 92 | 0.85 | 294 |
| 5 | 275 | 164 | 0.90 | 370 |
| 6 | 310 | 75 | 0.70 | 258 |
| 7 | 217 | 149 | 0.93 | 320 |
| 8 | 330 | 60 | 0.695 | 200 |
| 9 | 340 | 145 | 1.05 | 325 |

The various silica products obtained were tested in a rubber as a reinforcement additive therefor, the results of testing on the various examples being outlined in Tables V–VII.

TABLE V

RHEOLOGICAL PROPERTIES

| Example | Minimum couple | Maximum couple | Scorch time (min. and sec.) | Optimum time (min. and sec.) | Vulcanication rate (min.) |
|---|---|---|---|---|---|
| 1 | 9 | 87 | 3'30" | 6' | 2'30" |
| 2 | 11 | 92 | 5'15" | 7'45" | 2'30" |
| 3 | 10 | 90 | 3'45" | 6'15" | 2'30" |
| 4 | 6.5 | 86 | 4'45" | 7'45" | 3' |
| 5 | 9.5 | 95 | 3'30" | 6'45" | 3'15" |
| 6 | 9 | 87 | 2'45" | 5'45" | 3' |
| 7 | 9 | 95 | 4'30" | 7' | 2'30" |
| 8 | 11 | 91 | 6'15" | 9' | 2'54" |
| 9 | 9 | 95 | 4'30" | 8' | 2'30" |

TABLE VI

STATIC PROPERTIES

| Examples | Modulus 300% (kg/cm²) | Shore hardness | Rupture elongation (%) | Rupture strength (kg/cm²) |
|---|---|---|---|---|
| 1 | 51 | 65 | 505 | 121 |
| 2 | 50 | 67 | 510 | 133 |
| 3 | 50 | 65 | 455 | 116 |
| 4 | 46 | 68 | 523 | 132 |
| 5 | 36 | 69 | 618 | 168 |
| 6 | 41 | 65 | 490 | 84 |
| 7 | 45 | 65 | 525 | 118 |
| 8 | 43 | 65 | 480 | 75 |
| 9 | 45 | 66 | 530 | 120 |
| A | >45 | ≧65 | >450 | >100 |

TABLE VII

DYNAMIC PROPERTIES

| Example | Temperature rise (°C.) | E' 0% ($10^{-8}$ dynes cm$^{-2}$) | E' 50% ($10^{-8}$ dynes cm$^{-2}$) | E' 100% ($10^{-8}$ dynes cm$^{-2}$) | E'' 5% ($10^{-7}$ dynes cm$^{-2}$) |
|---|---|---|---|---|---|
| 1 | 20 | 1.15 | 1.00 | 1.80 | 0.80 |
| 2 | 21 | 1.50 | 1.00 | 1.50 | 1.05 |
| 3 | 20.5 | 1.50 | 1.20 | 2.0 | 1.05 |
| 4 | 21 | 1.65 | 1.10 | 2.0 | 0.95 |
| 5 | 26 | 2.00 | 1.20 | 1.60 | 1.65 |
| 6 | 16.5 | 0.85 | 0.90 | 1.90 | 0.65 |
| 7 | 22 | 1.25 | 1.10 | 2.00 | 0.95 |
| 8 | 19 | 0.95 | 0.80 | 1.50 | 0.60 |
| 9 | 22 | 1.40 | 1.15 | 2.00 | 1.00 |
| A | <21.5 | >1 | ≧1 | ≧1.5 | <1.1 |

Three properties were examined for each silica produced: (1) the rheological properties, namely minium couple, maximum couple, scorch time, optimum time, and speed of vulcanization; (2) static properties including 300% elongation modulus, Shore hardness, elongation at rupture and rupture strength; and, (3) dynamic properties including dynamic heating, dynamic elastic modulus at 0%, 5% and 100% elongation, and viscous modulus at 5% elongation.

The rheological properties were determined in accordance with ASTM Special Technical Publication No. 383, "Continuous Measurement of the Cure Rate of Rubber". The static properties were determined in accordance with the following standards:

| Rupture strength: | NF T 46 002 Testpiece A₁ |
|---|---|
| Rupture elongation: | NF T 46 002 Testpiece A₁ |
| Shore hardness: | ASTM 676-58 T (instantaneous reading) |
| Modulus at 300%: | AFNOR NF T 46 002 Testpiece A₁ |

Dynamic properties were determined after the method of Voet et al, *Rubber Chemistry & Technology*, v. 47, n. 4 at 758–77 (1974), and the final study report to the Delegation Generale a al Recherche Scientifique et Technique No. 73-7-1151.

A Goodyear flexometer was employed in the ascertaining of the properties and was adjusted as follows:

| Initial temperature of the chamber: | 30° C. |
|---|---|
| Load: | 11 kg |
| Amplitude: | 0.4 cm |

As a reference composition, the following vulcanized material was employed:

|  | Parts by weight |
|---|---|
| SBR 1509 rubber | 100.00 |
| Active ZnO | 3.00 |
| Stearic acid | 1.00 |
| Polyethylene glycol M = 4000 (PEG 4000) | 2.40 |
| Sulfur | 2.30 |
| Antioxidant (permanax 49 HV) [Bis(phenyl-isopropylidene)4,4'-diphenylamine] | 2.00 |
| N-cyclohexyl-2-benzothiazyl sulphonimide (Rhodifax 16) | 1.20 |
| Benzothiazyl disulphide (MBTS) | 1.20 |
| Di-O-tolylguanidine (DOTG) | 1.40 |
| Tetramethyl-thiurame disulphide (DMTT) | 0.20 |
| Silica | 40.00 |

Because the various minimum and maximum values in the vulcanized material obviously depend upon the material and the particular nature of the elastomer in question, the values shown at line A of Tables VI and VII are provided merely as a guide. In the case of the rheological properties, the limiting values have not been given since these, which are not covered by standards but merely advised values, also depend upon the operating conditions and are satisfactorily distributed within one and the same range.

Examination of Tables V-VII reflects that only the silicas in accordance with the present invention yield acceptable properties. Thus, in Examples 6 and 7, it is found that the reinforcing capacity of the silica is not adequate notwithstanding the fact that the water content of the cake is satisfactory. Similarly, Example 7 further demonstrates that it is not sufficient to merely provide an oil-absorption capacity within the prescribed range to yield a product exhibiting good reinforcement capacity.

Recognizing the need to provide a silica particulate which may be homogeneously and easily dispersed within the vulcanizate, this property was examined as well. To do so, sections of silica-loaded vulcanizing material, of approximately a few microns in dimension, were prepared. The silica was then preferentially colored with methyl red to provide contrast for optical microscopy, since the silica has the same initial refraction index as the elastomer.

The percentage dispersion in the samples is taken as the percent of silica dispersed in conglomerates of less than about 8 microns, and is calculated as:

$$\% \text{ dispersion} = 100 - SX/L$$

wherein:
$X$ = the total number of squares of 17 microns in the network of 10,000 squares;
$S$ = the surface swelling factor caused by the action of the swelling agent, or surface of the section after swelling surface of the section before swelling; and,
$L$ = percentage, by volume, of the silica in relation to the rubber as a whole, or (weight of silica)×(specific volume of silica)×100. (weight of the mixture)×(specific volume of the mixture)

If this factor is calculated to be greater than 98%, dispersion is considered to be good, while a factor between 95 and 98% is average, with 90 to 95% passable and below 90% considered poor. Employing this test, comparison between Examples 1 and 5 indicates that the former provides good results whereas the latter only average results.

While the preceeding examples employ a vulcanized material based on rubber of the SBR variety, additives in accordance with the present invention may, of course, also be used with other types of elastomers such as, for example, those of the EPDM type, polybutadiene, natural rubber, polyisoprene, and the like.

While the invention has now been described in terms of various preferred embodiments, and exemplified with respect thereto, the skilled artisan will readily appreciate that various substitutions, changes, modifications, and omissions may be made without departing from the spirit thereof. Accordingly, it is intended that the scope of the invention be limited solely by that of the following claims.

What is claimed is:

1. A synthetic amorphous silica adapted for the reinforcement of elastomeric materials and having a reinforcement-effective structure, comprising particulates having a CTAB surface area of from about 80 to about 125 m$^2$/g, a structure index of at least about 0.80, an oil absorption index (DBP) of from about 240 to about 320 cm$^3$/100 g, a BET surface area of from about 80 to about 310 m$^2$/g and wherein the ratio of BET area to CTAB area is at least about 1.1, and a wet cake moisture content of from about 75 to 82%.

2. The synthetic amorphous silica as defined by claim 1, in dried state.

3. A composition of matter comprising an elastomeric material, said elastomeric material having homogeneously dispersed therein a reinforcing amount of the particulates as defined by claim 2.

4. A method for producing a synthetic amorphous silica adapted for the reinforcement of elastomeric materials and having a reinforcement-effective structure, said method comprising the steps of:
(a) reacting a strong acid with an alkaline silicate solution having an initial SiO$_2$/Na$_2$O molar ratio of from about 2 to about 4, and an initial silicate concentration of from about 90 to about 150 g/l SiO$_2$;
(b) maintaining essentially constant the residual alkalinity of the reaction mixture during the reaction by adding said strong acid at a variable rate to the reaction mixture;
(c) adjusting said molar ratio to about 3.5 to effect a final silicate concentration of from about 60 to about 90 g/l SiO$_2$; and,
(d) adjusting the reaction temperature within the range of about 65° to about 95° C. to yield a silica product having a wet cake moisture of from about 75 to about 82%, corresponding to from about 2.6 to about 3.9 kg of water per kg of finished product; to yield an amorphous silica particulate having a CTAB surface area of from about 80 to about 125 m$^2$/g and a structure index of at least 0.80 in a total reaction time of from about 40 to 200 minutes.

5. The method of claim 4, wherein the acid additions are interrupted at least once during a period of from about 5 to about 20 minutes when maximum polymer formation is achieved.

6. The method of claim 5, wherein said total reaction time, excluding said interruptions, is from about 40 to about 200 minutes.

7. The method of claim 4, wherein said step of maintaining essentially constant said residual alkalinity comprises the step of periodically introducing fractions of said acid to the reaction mixture at intervals not exceeding about 10 minutes between successive additions.

8. A vulcanized elastomeric composition having homogeneously dispersed therein and firmly adhered thereto, a reinforcing amount of particulates of the synthetic amorphous silica as defined by claim 2, said vulcanizate having a percentage dispersion of at least 90%.

9. A vulcanized elastomeric composition having homogeneously dispersed therein and firmly adhered thereto, a reinforcing amount of particulates of the synthetic amorphous silica as defined by claim 2, said vulcanizate having a percentage dispersion of at least 95%.

10. A vulcanized elastomeric composition having homogeneously dispersed therein and firmly adhered thereto, a reinforcing amount of particulates of the synthetic amorphous silica as defined by claim 2, said vulcanizate having a percentage dispersion of at least 98%.

11. A tire comprising the vulcanized elastomeric composition as defined by claim 8.

12. A tire comprising the vulcanized elastomeric composition as defined by claim 9.

13. A tire comprising the vulcanized elastomeric composition as defined by claim 10.

* * * * *